Patented Jan. 18, 1949

2,459,563

UNITED STATES PATENT OFFICE 2,459,563

FLAVORING MATERIALS

Roy F. Larson, Robert Winston Liggett, and Wayne C. Mussulman, Decatur, Ill., assignors to A. E. Staley Manufacturing Company, Decatur, Ill., a corporation of Delaware No Drawing. Application May 19, 1947,
Serial No. 749,084

11 Claims. (Cl. 99—145)

This invention relates to improvements in the preparation of flavoring materials. More particularly, it pertains to methods for improving the aroma and flavor of unfermented liquid flavoring materials resembling the condiment known as soy sauce.

Genuine soy sauce is made by a fermentation process requiring from about two months to several years to complete. The fermented liquid has a characteristic pleasant aroma and flavor. In general, the sauces prepared by the longer fermentations have superior aroma and flavor.

Unfermented sauces resembling soy sauce may be prepared by hydrolyzing protein materials with a hot aqueous solution of hydrochloric acid. A liquid product similar to the fermented sauce then can be recovered from the hydrolyzed mixture by neutralizing the latter with a sodium base and filtering it to remove insoluble matter. Preferred sources of raw protein are soybeans, wheat, and milk. Other proteins, such as those present in corn, peanuts, and meat may also be used. Preparation of a sauce by hydrochloric acid digestion of a mixture of soybeans and wheat is described at pages 92-94 of the July, 1945, issue of Food Industries (vol. 17, No. 7, pages 758-760). Preparations of similar liquid products are described in United States Patents No. 1,992,462 and No. 2,049,576.

It has also been proposed to combine chemical hydrolysis of the protein raw material with subsequent fermentation of the neutralized hydrolyzate. For example, according to United States Patent No. 2,107,133, an acid hydrolyzed liquid product is first prepared from protein material, preferably soybean meal, then it is mixed with roasted wheat or equivalent cereal and fermented in a manner conventional for soy sauce. It is pointed out in this patent that the overall time of sauce production is greatly shortened by the acid predigestion, and that preferably the acid treatment should not completely hydrolyze the protein material to constituent amino acids. Even so, the shortened fermentation still requires several weeks, and the entire sauce has to be stored during that period. Also, according to Japanese Patent No. 91,407, equal parts of soybean or other vegetable protein materials are separately hydrolyzed with equal volumes of hot 10 percent hydrochloric acid and hot 10 percent sodium hydroxide solutions, the hydrolyzates are mixed, filtered, and the approximately neutral filtrate is fermented for about one month with yeast and other materials.

Compared with the conventional fermentation preparation of soy sauce, chemical hydrolysis alone of the protein raw material has two principal advantages. First, the preparation time is reduced from a minimum of about two months to a maximum of two or three days, and second, the liquid product obtained is much richer in amino acids and other soluble protein hydrolytic products. Offsetting these advantages, however, is the fact that the chemical sauce lacks the characteristic aroma and flavor of the fermented kind. The aroma and flavor of the chemical sauce are not unpleasant, but they are distinctly unlike those qualities of a fermented sauce.

Although the fermentation aroma and flavor of soy sauce may be considered as being relatively unimportant with respect to some uses of the sauce and similar liquid flavoring materials, such as those dependent solely upon color and salt content, they are quite important with respect to others. For example, since the fermentation aroma and flavor have long been associated with genuine soy sauce, they have become important criteria in the user's evaluation of the product, and generally are important factors in the user's enjoyment of it.

Combining chemical hydrolysis of the protein material with subsequent fermentation of the hydrolyzate, as suggested by the prior art, may tend to overcome the aroma and flavor disadvantages of the straight chemical sauce and may also reduce the fermentation time required by the conventional soy sauce process, but it still requires a preparation time that is quite long compared with that of a chemical sauce.

The principal objects of the present invention are materially to improve the aroma and flavor of unfermented liquid flavoring materials resembling soy sauce, and to reduce the preparation time and liquid storage facilities required in the conventional fermentation of soy sauce and in the modified conventional fermentation process comprising chemical hydrolysis of the protein material followed by fermentation of the hydrolyzate.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the application of which will be indicated in the claims.

Briefly, the objects of this invention are attained by fermenting a sugar-containing solution for a relatively short time under suitable conditions and then adding a small proportion of the fermented solution to the unfermented liquid flavoring material. Usually not more than about 5 to 10 percent of the fermented sugar solution need be added to the base material to impart to it pronounced degrees of fermentation aroma and flavor that closely resemble those properties of genuine soy sauce. The aroma and flavor effects produced by the addition are not mainly additive. That is, the flavor and aroma of the fermented sugar solution are not merely superimposed upon the unfermented liquid. Instead, there appears to be a combination effect by which the aroma and flavor of the mixture are unlike those properties of either component and strikingly similar to the aroma and flavor of fermented soy sauce.

We have found that the necessary fermentation of the sugar solution seldom extends beyond two weeks, and frequently can be accomplished in about one half that time. Since only about 5 to 10 percent of the fermented sugar solution, based on the unfermented flavoring material being treated, is required to produce the desired improvements in aroma and flavor, it will be apparent that our invention affords marked savings in time and storage facilities over the conventional and modified conventional fermentation methods for making soy sauce and similar liquid flavoring materials.

Yeasts, especially the osmophilic kind, constitute the preferred class of microorganisms for fermenting the sugar solution. Certain molds and bacteria may also be used. Preferably, pure culture fermentations are employed, altho under some conditions a "wild" or "natural" fermentation of the sugar solution will be satisfactory.

Osmophilic yeasts in general are satisfactory. Preferably, but not necessarily, the yeast should be grown in a sugar solution containing from about 10 to about 50 percent solids. This keeps down the size of the fermenter required for a given production of flavoring material, and eliminates the need of concentrating the fermented liquor, with attending danger of losing important aroma and flavor principles, before it is added to the base material. Another advantage in growing the osmophilic yeasts in the above specified concentrations of substrate is that such concentrations inhibit the concurrent growth of undesirable molds and bacteria, and thus eliminate the need of sterilizing the sugar solution beforehand.

The preferred molds are those suitable in the conventional fermentation preparation of soy sauce. Many of these are osmophilic and can be used in the concentrated sugar solutions, as indicated above, without sterilizing the solution beforehand. If a non-osmophilic mold is used with a more diluted sugar solution, it should be sterilized beforehand to prevent formation of undesirable odors and flavors by growth of improper molds and bacteria.

Unidentified microaerophilic bacteria isolated from fermenting molasses also have been found to be satisfactory fermenting agents for the sugar solution.

A preferred type of sugar-containing solution to be fermented and used in accordance with this invention is the mother liquor, or molasses, obtained in the refining of crude cane sugar. The optimum concentration range of this molasses, when being fermented with an osmophilic yeast, is about 20 to 40 percent solids. It can be successfully fermented, however, at higher and lower concentrations. The upper practical limit is about 50 percent solids. Above this concentration, only a few microorganisms will grow and produce the desired aroma and flavor principles within a reasonable time. There is no particular lower limit on the concentration with respect to speed of fermentation and quality of aroma and flavor produced. Concentrations below about 10 percent, however, are less desirable than higher ones because the molasses must be sterilized and a larger fermenter must be used.

Many sugar solutions other than refinery cane molasses may be used with satisfactory results. Among these are blackstrap molasses, starch syrups, and solutions of pure sugars such as sucrose, maltose, dextrose, and levulose. If the sugar solution lacks sufficient nitrogenous and mineral constituents for suitable growth of the microorganisms, these nutrient materials may be added to it.

It is preferred that the fermented sugar medium be so modified that only a relatively small proportion of it is required to produce the desired aroma and flavor effects in the unfermented product. The addition of large proportions of the sugar solution to the unfermented base material may alter the latter undesirably in several ways. The maximum permissible proportion of added sugar solution will depend, of course, upon its nature and the way it blends with the base material. From 1 to 10 percent by weight of the fermented sugar solution, based on the unfermented base sauce, is usually sufficient, but it is to be understood that the present invention is not limited to this range of proportions.

It is advantageous to use a sugar medium whose flavor and aroma are compatible with the base flavoring material. Refinery cane molasses and blackstrap molasses are particularly suitable for this reason.

Our invention is illustrated by the following examples in which all parts are by weight unless otherwise specified.

*Example 1*

Unfermented liquid sauce similar to soy sauce was prepared by acid digestion of soybean meal according to directions given in United States Patent No. 1,992,462. Refinery cane molasses diluted with water to 40 percent solids was inoculated with a culture of *Zygosaccharomyces nussbaumeri* and incubated for five days at 100° F. The molasses acquired a strong fermentation odor and flavor. Addition of 6 parts of the fermented molasses to 94 parts of the acid digested sauce greatly improved the aroma and flavor of the latter, making it closely resemble genuine soy sauce in those two respects. Substitution of the following strains of yeast for *Z. nussbaumeri* yielded satisfactory results: *Zygosaccharomyces rugosus*; *Z. richteri*; *Z. japonicus*; *Z. mellis*; and, *Shizosaccharomyces octosporus*.

*Example 2*

Same as Example 1 using *Z. nussbaumeri* but substituting a sugar solution containing 30 percent sucrose by weight, 0.3 percent yeast extract, and 0.5 percent peptone for the diluted refinery molasses. The aroma and flavor of the base sauce were distinctly altered to resemble more nearly those two properties of fermented soy sauce.

*Example 3*

Same as Example 1 using *Z. nussbaumeri* but substituting a sugar solution containing 20 percent dextrose by weight, 0.3 percent yeast extract, and 0.5 percent peptone for the diluted refinery molasses. The aroma and flavor of the base sauce were improved to about the same extent as in Example 2.

*Example 4*

Same as Example 1 using *Z. nussbaumeri* but substituting a 10.5 Bé. starch conversion liquor having a dextrose equivalent of 55 and a fermentable extract of 50 for the diluted refinery molasses. The improvement in the aroma and flavor of the base sauce was about the same as that obtained in Examples 2 and 3.

*Example 5*

Refinery cane molasses diluted with water to 20 percent solids was inoculated with a strain of *Aspergillus flavus* and incubated at 90° F. for eleven days. Addition of 8 parts of the fermented molasses to 92 parts of the base sauce used in Example 1 distinctly improved the aroma and flavor of the latter, making it more nearly resemble fermented soy sauce in those two respects.

*Example 6*

Refinery cane molasses diluted with water to 10 percent solids was inoculated with an unidentified microaerophillic bacterium isolated from fermenting refinery cane molasses and incubated at 100° F. for eleven days. Addition of 10 parts of the fermented molasses to 90 parts of the base sauce used in Example 1 improved the odor and flavor of the base sauce to about the same degree as obtained in Example 5.

*Example 7*

Same as Example 1 except that the base sauce used therein was replaced by an unfermented sauce prepared by acid digestion of a mixture of soybeans and wheat according to directions given at pages 92–94 of the July, 1945, issue of Food Industries. The aroma and flavor of the base sauce were markedly improved, being changed to resemble quite closely those two properties of genuine soy sauce.

*Example 8*

Same as Example 1 except that the base sauce used was replaced by an unfermented sauce prepared by acid digestion of casein according to the directions given in United States Patent No. 2,049,576. The improvement in the aroma and flavor of the base sauce was about the same as that obtained in Example 1.

It will be apparent to those acquainted with the fermentation of sugars by molds, yeasts, and bacteria, that many such fermentations, especially those performed by molds and bacteria, will yield odors and flavors unsuited to the purpose of this invention. For example, bacteria of the genus Clostridia are in general unsuitable, and some strains of *Aspergillus niger* yield unpalatable odors and flavors during fermentation. No broad claim is made to improving the flavor and aroma of unfermented liquor flavoring materials similar to soy sauce by adding thereto a relatively small proportion of a solution resulting from the fermentation of a sugar-containing solution by any mold, yeast, or bacteria. Determination of the suitability of the fermented sugar solution for the purpose of this invention is based on compatibility of the aroma and flavor of the fermented solution with the unfermented base material. We have found that if the aroma and flavor of the fermented sugar solution are not unpleasant or disagreeable alone, addition of such fermented solution to the unfermented base solution improves the aroma and flavor of the latter. It also is to be pointed out that the criterion of usefulness of the fermented sugar solution is not necessarily that the aroma and flavor of the solution shall resemble those two properties of fermented soy sauce. As mentioned earlier, the blending of the aromas and flavors is not simply additive. Frequently a fermented sugar solution having a strong fermentation odor and flavor, neither one disagreeable but neither one similar to the corresponding property of fermented soy sauce, provides a pronounced improvement in the base material, i. e., makes its aroma and flavor strongly resemble those two properties of fermented soy sauce.

As used hereinbefore, and in the appended claims, the verb "ferment" and its derivatives refer to the action and effects of growing microorganisms selected from the group consisting of molds, yeasts, and bacteria.

Likewise the expression "unfermented liquid flavoring material similar to soy sauce" refers to palatable aqueous solutions derived principally from protein raw material by means other than the action of microorganisms. Usually, in the preparation of such flavoring materials, the protein raw material is hydrolized with hot dilute hydrochloric acid, then neutralized with a sodium base, and filtered. It is to be understood, however, that other means are available. For example, the protein raw material may be hydrolyzed with a sodium base, then neutralized with hydrochloric acid. Or, the protein material may be hydrolyzed with an acid whose unpalatable anion can be removed as an insoluble material. Examples of this would be hydrolysis with sulfuric or phosphoric acid followed by neutralization with lime. Again, the protein raw material may be hydrolyzed with any selected acid or base, the hydrolyzate neutralized with any selected base or acid, and the unpalatable anions and cations removed with ion exchange materials.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. In the production of chemically prepared, fermented soy sauce-type condiment, the improvement which comprises fermenting a sugar-containing solution until it develops an aroma and a flavor compatible with said condiment and adding to said condiment a relatively small proportion of the fermented solution, whereby the aroma and flavor of the condiment are improved.

2. In the production of chemically prepared, fermented soy sauce-type condiment, the improvement which comprises fermenting a sugar solution containing from 10 to 50 per cent sugar solids by weight until it develops an aroma and a flavor compatible with said condiment and adding to said condiment about 1 to 10 per cent by weight of the fermented solution, whereby the aroma and flavor of the condiment are improved.

3. The improvement according to claim 2 in which the sugar-containing solution is fermented by *Zygosaccharomyces nussbaumeri*.

4. The improvement according to claim 2 in which the sugar-containing solution is fermented by *Zygosaccharomyces richteri*.

5. The improvement according to claim 2 in which the sugar-containing solution is fermented by *Shizosaccharomyces octosporus*.

6. The improvement according to claim 2 in which the sugar-containing solution used in refinery cane molasses.

7. The improvement according to claim 2 in which the sugar-containing solution is black strap molasses.

8. The improvement according to claim 2 in which the sugar-containing solution is starch syrup.

9. In the production of chemically prepared, fermented soy-sauce-type condiment, the improvement which comprises fermenting refinery cane molasses containing from 10 to 50 per cent sugar solids by weight with *Zygosaccharomyces nussbaumeri* until it develops an aroma and flavor compatible with said condiment, and adding to said condiment about 1 to 10 per cent by weight of the fermented molasses, whereby the aroma and flavor characteristics of the condiment are improved to resemble genuine fermented soy sauce.

10. The provement according to claim 9 in which the refinery cane molasses is fermented by *Zygosaccharomyces richteri*.

11. The improvement according to claim 9 in which the refinery cane molasses is fermented by *Shizosnaccharomyces octosporus*.

ROY F. LARSON.
ROBERT WINSTON LIGGETT.
WAYNE C. MUSSULMAN.

REFERENCES CITED

The following references are of record in the file of this patent:

UNITED STATES PATENTS

| Number | Name | Date |
|---|---|---|
| 1,332,448 | Satow | Mar. 2, 1920 |
| 2,107,133 | Snelling | Feb. 1, 1938 |

FOREIGN PATENTS

| Number | Country | Date |
|---|---|---|
| 519,771 | Great Britain | Apr. 5, 1940 |

OTHER REFERENCES

"The Microbiology of Foods," by Tanner, second editions, published in Champaign, Illinois, by Garrard Press, 1944, pages 752 and 753.

Certificate of Correction

Patent No. 2,459,563.   January 18, 1949.

ROY F. LARSON ET AL.

It is hereby certified that errors appear in the printed specification of the above numbered patent requiring correction as follows:

Column 5, line 11, for "sause" read *sauce*; line 64, for the word "liquor" read *liquid*; column 7, line 10, claim 6, for "used in" read *used is*; line 19, claim 9, after "soy" strike out the hyphen; column 8, line 1, claim 10, for "provement" read *improvement*;

and that the said Letters Patent should be read with these corrections therein that the same may conform to the record of the case in the Patent Office.

Signed and sealed this 16th day of August, A. D. 1949.

[SEAL]

THOMAS F. MURPHY,
*Assistant Commissioner of Patents.*